US010118292B2

(12) United States Patent
Parrott et al.

(10) Patent No.: US 10,118,292 B2
(45) Date of Patent: Nov. 6, 2018

(54) SYSTEMS AND METHODS FOR CONFIGURING FIELD DEVICES USING A CONFIGURATION DEVICE

(71) Applicant: Saudi Arabian Oil Company, Dhahran (SA)

(72) Inventors: Brian Parrott, Thuwal (SA); Pablo Carrasco Zanini, Makkah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 210 days.

(21) Appl. No.: 15/240,530

(22) Filed: Aug. 18, 2016

(65) Prior Publication Data
US 2018/0050450 A1  Feb. 22, 2018

(51) Int. Cl.
*G05B 19/418* (2006.01)
*B25J 9/00* (2006.01)
(Continued)

(52) U.S. Cl.
CPC ......... *B25J 9/0084* (2013.01); *B25J 11/0085* (2013.01); *H04W 4/02* (2013.01);
(Continued)

(58) Field of Classification Search
CPC ...... B25J 11/0085; H04W 4/02; H04W 4/026; H04W 4/04; H04W 4/80; H04W 8/005; H04W 8/26
(Continued)

(56) References Cited

U.S. PATENT DOCUMENTS 8,374,721 B2 * 2/2013 Halloran .................. A47L 5/30
                                                 700/245
8,504,008 B1   8/2013 Gossweiler, III et al.
(Continued)

FOREIGN PATENT DOCUMENTS

EP          1265118 A1    12/2002

OTHER PUBLICATIONS

Bouzid et al. "Robot Networks with Homonyms: The Case of Patterns Formation." Lecture Notes in Computer Science Stabilization, Safety, and Security of Distributed Systems, May 29, 2011, doi:10.1007/978-3-642-24550-3_9. 18 pages.
(Continued)

*Primary Examiner* — Harry Y Oh
(74) *Attorney, Agent, or Firm* — Leason Ellis LLP

(57) ABSTRACT

A system and method is disclosed for configuring a group of mobile field devices using a configuration device (an HMI) is provided. In particular, the HMI is programmed to configure identically programmed field devices that are arbitrarily arranged in an application-dependent formation by defining and providing configuration parameters to the devices via wired and/or wireless communication. In particular, the HMI assigns a unique identifier to respective robots as a function of the position of the robot within the formation or the layout of the environment. Accordingly each robot can be efficiently configured by the HMI to operate independently yet as a coordinated member of the group and without requiring the robots to be placed in specific positions during the initial deployment. This obviates the need for constant independent control commands for each robot by a central controller or providing a customized control program to each robot during deployment.

20 Claims, 10 Drawing Sheets

(51) Int. Cl.
*H04W 4/80* (2018.01)
*B25J 11/00* (2006.01)
*H04W 4/02* (2018.01)
*H04W 4/04* (2009.01)
*H04W 8/00* (2009.01)
*H04W 8/26* (2009.01)

(52) U.S. Cl.
CPC ........... *H04W 4/026* (2013.01); *H04W 4/027* (2013.01); *H04W 4/04* (2013.01); *H04W 4/80* (2018.02); *H04W 8/005* (2013.01); *H04W 8/26* (2013.01); *G05B 2219/23161* (2013.01); *G05B 2219/23406* (2013.01); *G05B 2219/31034* (2013.01)

(58) Field of Classification Search
USPC .......................................................... 700/248
See application file for complete search history.

(56) References Cited

U.S. PATENT DOCUMENTS

| | | | |
|---|---|---|---|
| 9,088,305 | B2 | 7/2015 | Jurgovan et al. |
| 9,796,091 | B1* | 10/2017 | Soo .................. B25J 9/1689 |
| 2007/0297890 | A1* | 12/2007 | Sjoberg ................ B25J 13/065 414/735 |
| 2010/0081375 | A1 | 4/2010 | Rosenblatt et al. |
| 2010/0290351 | A1 | 11/2010 | Toepke et al. |
| 2011/0246338 | A1 | 10/2011 | Eich |
| 2012/0152877 | A1* | 6/2012 | Tadayon .................. B25J 5/02 212/224 |
| 2012/0202427 | A1 | 8/2012 | Gioscia et al. |
| 2013/0123981 | A1* | 5/2013 | Lee .......... H04W 4/02 700/248 |
| 2014/0095164 | A1* | 4/2014 | Sone ........................ H04L 51/16 704/260 |
| 2014/0098486 | A1 | 4/2014 | Davis |
| 2014/0207282 | A1* | 7/2014 | Angle ................... H04L 12/282 700/257 |
| 2015/0100674 | A1 | 4/2015 | Chiche et al. |
| 2015/0133047 | A1 | 5/2015 | Smith et al. |
| 2015/0148951 | A1* | 5/2015 | Jeon ..................... G05D 1/0219 700/248 |
| 2015/0249735 | A1* | 9/2015 | Miller ..................... H04W 4/70 455/420 |
| 2016/0363930 | A1* | 12/2016 | Kwak .................. G05D 1/0231 |
| 2017/0000307 | A1* | 1/2017 | Choi .................. A47L 11/4011 |

OTHER PUBLICATIONS

Lee et al. "Decentralized formation control for a team of anonymous mobile robots." The 6th Asian control, Bali (2006). pp. 971-976.
International Search Report and Written Opinion for International Patent Application No. PCT/US2017/044071 dated Nov. 2, 2017. 11 pages.

* cited by examiner

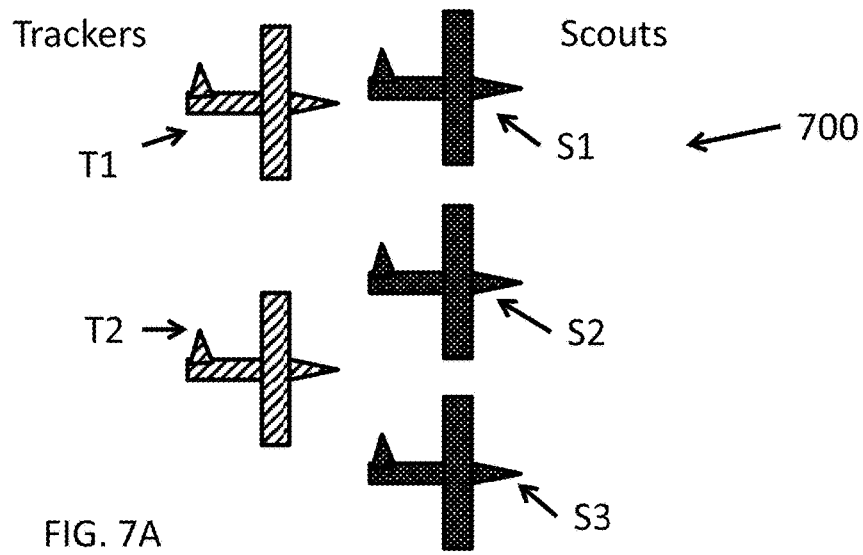
FIG. 7A
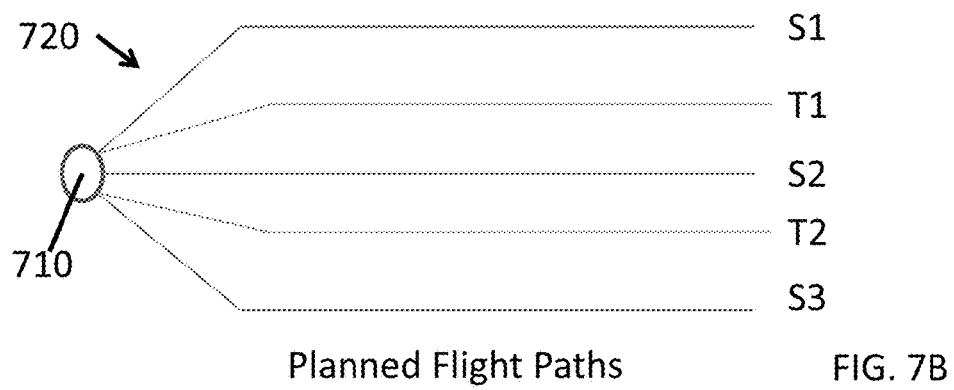
Planned Flight Paths     FIG. 7B
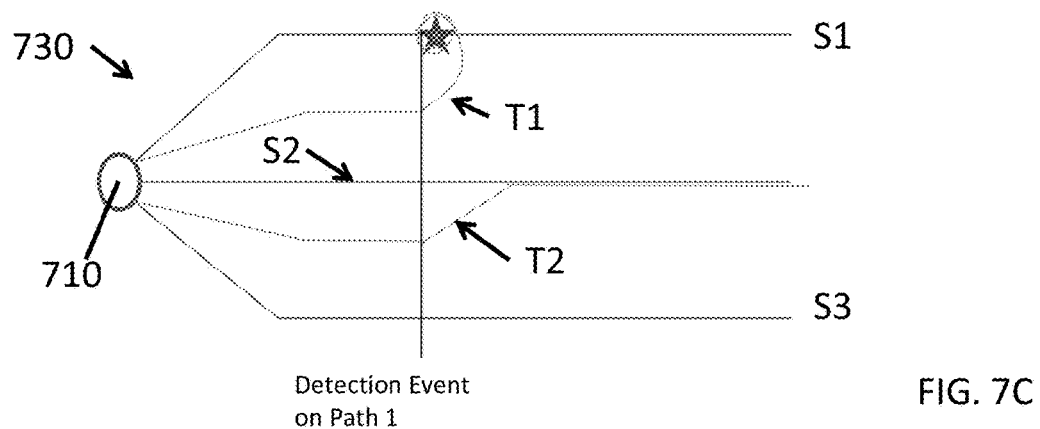
Detection Event on Path 1     FIG. 7C Planned Flight Paths Detection Event on Path 1

Actual Flight Paths

SYSTEMS AND METHODS FOR CONFIGURING FIELD DEVICES USING A CONFIGURATION DEVICE

FIELD OF THE INVENTION

The present invention relates to field devices, in particular to systems for configuring groups of field devices using a configuration device.

BACKGROUND

Autonomous and semi-autonomous deployable field devices (e.g., robots) are frequently used in industrial, commercial and every-day applications. Commonly, mobile robots systems, particularly on the industrial and commercial scale, consist of a multitude of robots, and the applications often require the individual robots to operate independently and as coordinated members of the group of robots. A robotic cleaning solution for cleaning multiple solar panel arrays is an example system that typically requires deployment of a plurality of robots in the field and coordinated operation of the robots to perform optimally.

Coordinated operation of a group of robots traditionally requires that each robot have a unique identifier, thereby allowing a centralized control station to uniquely identify the robot. Traditionally, these unique identifiers are static, and can be linked to other pieces of information such as the robot's relative position and/or function within the system, which allows the centralized control station to control and communicate with each unique robot individually. The ability to communicate and control individual actors in a targeted manner is essential for the coordination of the entire group. In almost all cases, robots in such a configured group are programmed individually to perform respective tasks within the larger group and, although each robot can be identical in type and function, each robot is provided with a control program that is specifically tailored to that particular robot, its task within the group and/or the operational environment.

Currently, programming a robot via a computer, even its initial configuration, can require a complicated setup process that is often reserved for the manufacturing/lab environment since not all of the memory on the robot can be easily programmed in the field. Other methods include programming each robot on-site using a dedicated computer that is connected to the robot via a high-speed programming connector such as a USB cable and/or programming each robot using an on-board Human-Machine Interface (HMI) that is provided on each robot. Each of these methods presents significant drawbacks. For instance, if the robots are pre-programmed at the factory, then each individual robot needs to be tracked from the factory to its specific corresponding position in the array of devices at the deployment site; failing to place any given robot in its correct position in the array could result in unexpected/undesired behaviors. Moreover, the centralized control station needs to have the device's preprogrammed IDs inputted manually and associated with a specific function. Alternatively, programming each robot using an HMI onboard each robot leads to increased device cost. In addition, typical HMIs that are on-board robots have minimal functionalities and therefore can cause the individual setup of each device to be lengthy and inefficient. Lastly, if the robots are programmed in the field, the typical setup would require a data communications port to be provided on an exterior of the robot, and a computer would need to be taken to the field and be physically connected to every robot. This is not only time consuming during deployment, but also may require an exposed port for the connection which increases the complexity of the electronics box. When high ingress protection ratings are required for the robot, such an exposed port can be a major drawback. Additionally, an exposed port further exposes the configuration details of the system to misuse/intentional abuse.

The present invention addresses these and other limitations associated with the efficiency of existing systems and methods for configuring a group of mobile field devices to operate as independent and coordinated members of the group. It is with respect to these and other considerations that the disclosure made herein is presented.

SUMMARY

According to an aspect of the present invention, there is provided a method for configuring a group of mobile robots for cleaning an array of solar panels to perform non-identical operations in a coordinated manner. The method includes the steps of physically associating the mobile robots with respective solar panels in the array thereby forming an application-dependent formation of robots. Each robot includes a non-transitory computer readable memory storing the control program, a communication interface and a processor that is configured to control operation of the robot according to the control program. The method includes configuring a first robot associated with a first solar panel in the array with an HMI. IN particular, the HMI is a portable computing device including a computer-readable storage medium having executable instructions stored therein, a communication interface and a processor that is configured by executing the instructions. The step of configuring the first robot including: establishing, by the HMI using the communication interface, communication with the first robot. In addition, configuring the first robot further includes determining, by the HMI, a respective starting position within the formation for the first robot and automatically defining, by the HMI, respective configuration settings for the first robot including at least a respective device identifier (ID). In particular, the respective device ID is assigned as a function of the determined respective starting position and is defined irrespective of any pre-existing unique identifier assigned to the first robot. The method also includes transferring, by the HMI using the communication interface, the configuration settings to the first robot. Then, the configuring steps are repeated for the remaining robots in the formation and, according to the method, the HMI assigns a unique device ID to each of the robots as a function of respective starting positions and is incremented according to a prescribed sequence that corresponds to the application-dependent formation. Lastly, the method includes initiating coordinated operation of the group of robots according to the control program and the respective configuration settings.

According to a further aspect of the present invention, there is provided a method for configuring a plurality of mobile field devices to perform non-identical operations in a coordinated manner according to a control program. The method includes the step of arranging a plurality of field devices in an operational environment. The field devices are programmed with the same control program and are arranged to occupy respective starting positions in an application-dependent formation without regard to which particular field device occupies which starting position in the formation. In addition, each field device includes a non-transitory computer readable memory storing the control program including instructions in the form of code therein, a wireless transceiver and a processor that is configured by executing the instructions. The method further includes configuring each of the plurality of field devices using an HMI, which is a portable computing device including a computer-readable storage medium having executable instructions stored therein, one or more position sensors, a wireless transceiver and a processor that is configured by executing the instructions. In particular, configuration of a particular field device includes the step of positioning an HMI in proximity to a particular field device. The method also includes establishing, by the HMI using the transceiver, wireless communication between the HMI and the particular field device, and determining the respective starting position occupied by the particular field device in the formation. The method also includes automatically defining, by the HMI, configuration settings for the particular field device including at least a respective device identifier (ID). The device IDs are defined incrementally and as a function of the respective starting position within the formation. In addition, the method includes transferring, by the HMI using the wireless transceiver, the configuration settings to the particular robot to configure the particular robot. In addition, upon configuring all of the field devices as described above, the method includes initiating coordinated operation of the plurality of field devices according to the control program and the respective configuration settings.

These and other aspects, features, and advantages can be appreciated from the accompanying description of certain embodiments of the invention and the accompanying drawing figures and claims.

BRIEF DESCRIPTION OF THE DRAWINGS

FIG. 7A is a high-level diagram illustrating an exemplary configuration of field devices configured according to an embodiment of the present invention;

FIG. 7B is a high-level diagram illustrating an exemplary operation plan for the group of field devices depicted in FIG. 7A;

FIG. 7C is a high-level diagram illustrating an adapted operation plan for the group of field devices depicted in FIG. 7A;

DETAILED DESCRIPTION OF CERTAIN EMBODIMENTS OF THE INVENTION

Figure 1:
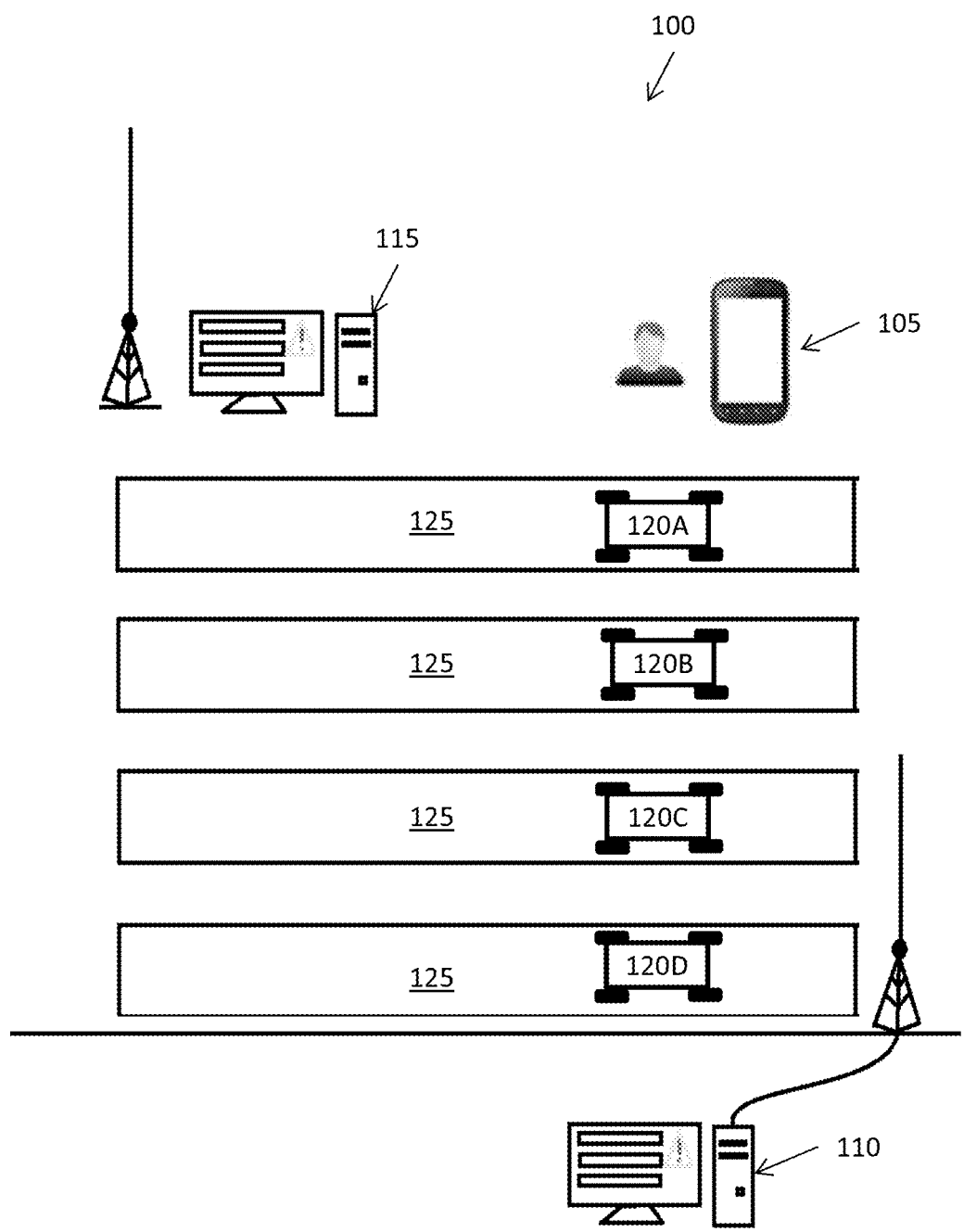
FIG. 1 is a high-level diagram illustrating an exemplary configuration of a system for configuring field devices.

By way of overview and introduction, a system and method is disclosed for wirelessly configuring a group of field devices. The system includes a configuration device referred to as a human-machine interface (HMI) which is, preferably, a portable, user-operated device that is programmed to configure a group of field devices as the field devices are being deployed in the field. Preferably, the field devices are the same type of device (e.g., identically programmed with a common control program).

The HMI can be utilized to set up communication protocols (radio, wireless, etc.) and other parameters on one or more centralized system control station(s) and or to read pre-defined settings from such a system. The same HMI can then be used to share these settings with each of the field devices. According to a further aspect, the HMI is configured to define a unique ID for each field device during configuration and additional operational parameters if required. The unique ID for each field device is automatically defined by the HMI in the field during deployment. In some implementations, at the end of the configuration process, records of the field device configurations (e.g., device specific or formation data) can then be transferred by the HMI to a computer for integration into a master control program and sharing with networked devices as appropriate. In some implementations an HMI can also serve as a central control station guiding the operation of the field devices after deployment and during operation.

According to a salient aspect, the configuration process includes automatically assigning and providing a unique identifier to each field device, by the HMI, when the HMI is brought in proximity with the field device. Assigning unique identifiers to the devices eliminates the need to rely upon an existing ID (e.g., a MAC address) on each field device, which would need to be read and recorded on a standalone controller computer such that the controller computer can transmit, according to that static device ID, specifically addressed control instructions to the field device or provide the field device with a control program that is specifically adapted to the field device. Rather, in accordance with the disclosed method for configuration of field devices, each field device can be identically programmed with a control program and, the HMI is configured to streamline the field configuration process through assigning a unique identifier to respective field devices, which is a function of the position of the field device within the formation of field devices or the layout of the environment. Accordingly each field device can be efficiently configured to operate independently yet as a coordinated member of the group of field devices and without requiring specific field devices to be placed in specific positions during the initial deployment. This further obviates the need for constant independent control commands for each field device by a central controller or providing each field device with a customized control program during deployment in the field.

In addition, the configuration of a group of field devices can be further optimized by the HMI, which is configured to automatically increment the device IDs as the HMI is tapped on successive devices in the formation, moved within near-field communication range, or when an input on the HMI is activated by the user. Incrementally assigning device identifiers to each device in a coordinated group in a location-dependent manner enhances the ability of each device to operate as a coordinated member of the group. As a further result, the HMI can be used to configure a group of field devices in a quick and efficient fashion, without extensive customized programming for each field device. Moreover, the HMI can be further configured to minimize the need for manually inputting all information and settings for each field device, allowing for quicker setup of a field device, by assuming certain common variables (e.g., row length) were not changed from one respective position in the formation to another.

According to another aspect, the HMI can comprise a portable electronic, programmable device such as a conventional smartphone or tablet device configured to interact with a variety of different types of field devices using short range wireless communication. As a result, this arrangement eliminates the need for a wired connection and exposed data-ports on each field device or for having an HMI included in each field device. As a further result, the HMI can interact with field devices without direct contact (e.g., through walls/barriers). In addition, the relatively short effective range of inductive NFC enhances security by localizing the data exchange to the directly proximate device as well as ensuring configuration data is sent only to the designated target. This particular aspect addresses a major problem with wireless configuration of devices that do not already have unique and pre-shared identities. The inventive system and method also increases security as it prevents a remote user from obtaining the configuration information, in which passwords for the wireless network or other critical information might be shared.

According to another aspect, multiple groups that each represent a different type of field device, and/or groups comprised of different types of field devices can also be configured using the HMI to perform non-identical operations in a coordinated manner according to a common control program.

Although the exemplary systems and methods for wirelessly configuring a group of field devices are further described in the context of certain practical implementations (e.g., robots configured to provide a solar array cleaning solution), it should be understood that the subject invention is not limited to this exemplary implementation. The invention can similarly applied to other systems that include a plurality of field devices which are deployed in an application-dependent formation and which are intended to operate in a coordinated and non-identical manner, for example, a 2-D lighting array for providing a lighting display, a group of robots configured to perform coordinated maneuvers over terrain, or a group of drones configured to fly in formation and according to a flight plan. In addition, although some embodiments are described for configuring a group of field devices of the same type, it can be appreciated that the systems and methods disclosed herein can be similarly applied to configure multiple groups of different field devices to perform non-identical operations in a coordinated manner, provided that the various field devices are operating according to respective versions of a common control program.

An exemplary system for configuring field devices 100 is shown in FIG. 1. As shown in FIG. 1, the system 100 is implemented as a dust mitigation solution that is arranged for cleaning an array of solar panels 125. It can be appreciated that an "array of solar panels" as further described herein can take various forms without departing from the scope of the disclosed embodiments, for example and without limitation, the array of solar panels can consist of multiple individual solar panels arranged in an array, or multiple rows that each consist of one or more solar panels and wherein the rows are arranged in an array. The system 100 includes a plurality of field devices, in this specific example, mobile robots 120A-D that are configured to clean the solar panels according to a control program and at least one human-machine-interface computing device (HMI) 105. The HMI 105 is used to configure the robots during deployment, as further described herein. Deploying dust mitigation robots in a mid-sized solar power plant generally would require hundreds of robot units, at least one for each row of solar panels. However, for simplicity the exemplary array of solar panels is depicted as including four separate rows of solar panels with at least one robot 120A-120D on each panel. Although the device used to configure the field devices is described as an "HMI" such as a tablet computer having a graphical user interface and configured to transmit information to the robots, the HMI is not limited to this configuration. The HMI can take on various forms of computing devices capable of performing the functions of configuring the field devices as further described herein. For example and without limitation, the HMI can be a portable token device specifically programmed to perform field configuration and having a small screen (optional) and a button providing limited user-input functionality for initiating the configuration process and other user inputs relating to configuration. By way of further example, the HMI is not necessarily a hand-held device and can be fixed on a vehicle that is transporting the devices to the field, so as to automatically configure devices as they are removed from the vehicle and placed into position. By way of further example, in some implementations, the HMI can comprise a Read/Write Tag that is read by each field device during deployment and is configured to automatically increment the DeviceID so as to enable configuring subsequent field devices as further described herein (e.g., no user interaction is needed except to bring the tag/token device within range of each robot for a short period of time, say, 1 second).

As would be understood by those in the art of robotics, each robot is a mobile robotic device that includes a body and a motion system for moving the robot during operation. The robot can be powered by, for example, solar cells, batteries, or any other suitable power source. The robot can include functional hardware components specifically designed to facilitate performing operational tasks, for instance, brushes for cleaning solar panels, cameras or other such sensors for inspecting panels, detecting position, orientation, and the like. The robot can also be wireless and self-contained without the need for tethers or other wired connections to provide power, transmit data and/or receive operating commands. The robot can include electronic circuitry within the body that includes a memory and/or computer readable storage medium which are configured to store information relating to the operation of the robot such as configuration settings and one or more control programs.

A control program can include machine-readable instructions that are executable by the robot's processor to configure the processor to control the operation of the robot according to the control program. As further described herein, the control program configures the robots to act in a pre-defined fashion based on each robot's assigned identifier, with the identifier being assigned during deployment as a function of the robot's position within the group formation. Accordingly, the control program causes each robot to operate autonomously and also as a coordinated member of the group of robots. For example, the control program can provide that, in the event that the wind is blowing a certain direction, robot 1, which corresponds to the first row of panels begins cleaning at a particular time and, robot 2 on the second panel begins cleaning after robot 1 completes cleaning, and so on. Each robot in a group of robots can be identical in the sense that they are the same type of robot or are at least identically programmed and therefore functionally interchangeable. It should however be noted that a control program can include a number of sub-programs/routines, or a suite of different control programs for different applications, and, as such, separate groups of robots can be configured to operate in a coordinated manner according to respective control programs.

The robot can also include one or more communication interfaces, such as wireless transceivers, for transmitting or receiving information with proximate devices such as the HMI. In one exemplary configuration, the wireless transceiver can include a short-range radio-frequency RF transceiver (e.g., is NFC enabled) for communicating with at least the HMI via an antenna resting on or near a top surface of the body of the robot. In addition, the wireless transceiver can be of the type that has a longer transmission range for wirelessly communicating with more remote devices such as the control computer 110, the weather station 115, other robots, the HMI and the like.

The system 100 can also include one or more additional computing devices, such as a control computer 110 and a weather station 115, which can be part of the operational solution. However, it can be appreciated that such additional computing devices are not required. The control computer 110 is intended to represent various types of computing device such as laptops, desktops, workstations, servers, and other appropriate controllers and/or networked computing systems and other such data processing apparatuses capable of monitoring and communicating with the HMI 105, robots 120A-D and facilitating the operation of the robots according to the control program as further described herein. Similarly, weather station 115 is intended to represent various forms of computing devices configured to monitor and provide environmental information to one or more of the robots 120A-D and/or the HMI 105 to facilitate the operation of the robots in accordance with the control program.

Although robots are described as operating according to the common control program executing on each robot, in addition or alternatively, the robots can operate based on information received from remote computing devices during operation. For instance, specific control instructions received from the control computing device or environmental information received from the weather station 115 can cause the robots to modify their operational behavior. Accordingly, the exemplary cleaning solution can rely on a combination of autonomous cleaning robots that are coordinated according to the control program and control devices that can modify operation of the robots (e.g., based on local field conditions). As noted above, additional computing devices, such as a control computer 110 and a weather station 115, can be part of the operational solution to provide information to the robots and facilitate the operation of the group. It can also be appreciated that, in certain implementations, some or all of the functions performed by the additional computing devices can be performed by the HMI. Similarly, some or all of the control computer functions can be performed by one or more of the robots (e.g., robot 120A) in the group, for instance, as a master node within the network of robots that is designated by the assigned Unique ID for the robot.

Figure 2:
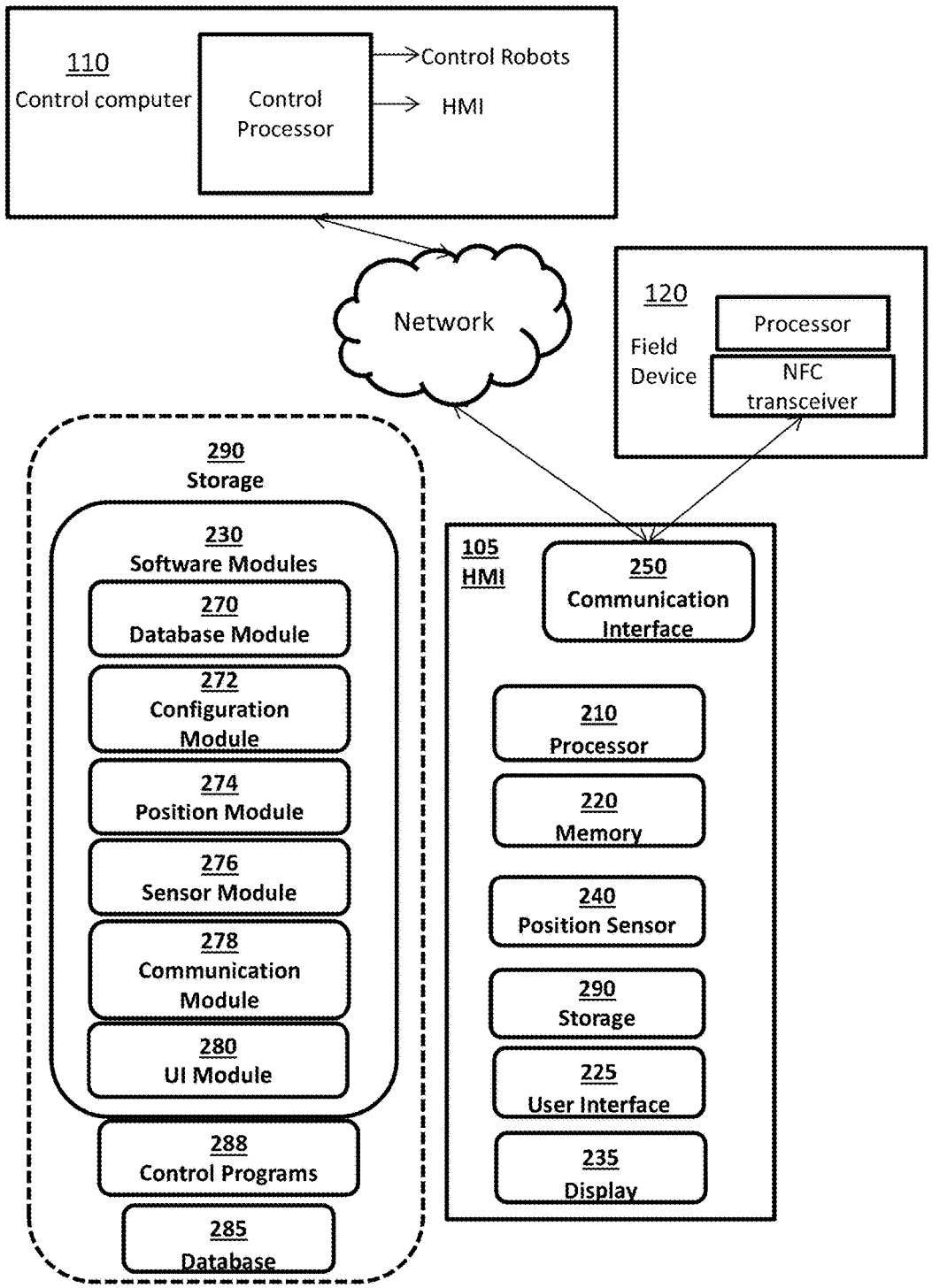
FIG. 2 is a block diagram illustrating an exemplary configuration of a wireless human-machine-interface device according to an embodiment of the present invention.

In reference to FIG. 2, an exemplary HMI 105 of the system for configuring a group of field robots 100 is further described. The HMI 105 can be arranged with various hardware and software components that serve to enable operation of the system, including a processor 210, a memory 220, a display 235, a user interface 225, one or more position sensors 240, a communication interface 250 and a computer readable storage medium 290.

The processor 210 serves to execute software instructions that can be loaded into the memory 220. The processor 210 can be a number of processors, a multi-processor core, or some other type of processor, depending on the particular implementation. The display can be displayed on a touch-screen or other display operatively coupled to an input device (not shown).

As previously noted, in accordance with the disclosed embodiments, a wireless HMI using inductive-communication technology is configured to interact with field/industrial robotic systems. Inductive-coupling based communication offers unique advantages as it is short-range (making it secure and specific), it can be used to transfer useful amounts of power along with data, and it can pass through a robot body/casing, walls or other non-metallic objects. The exemplary commercially available tablet-device HMI configuration preferably does not rely upon a robot-specific form factor, making it a universal HMI device that is capable of configuring field robots from many different manufacturers adhering to common programming and operational standards.

As further described herein, the HMI is configured to contact the robot, say, be set on top of the robot, form a communication bridge and then assign all relevant configuration data to the robot in a secure and quick fashion. This setup could be optimized such that the device ID is incremented automatically, thus meaning a simple tap (or other means of establishing the communication link), on each successive robot could be sufficient to uniquely assign a device ID and thereby configure each robot to execute aspects of the control program that are specific to the assigned device ID.

In addition, the exemplary HMI can be used to monitor data from the processor and/or sensors on-board the HMI, to implement and/or define new control schemes or variables in the field without the need for redundant HMIs or sensors on-board each of the robots or full wireless communication capabilities, which might impact the available bandwidth for the various devices that comprise the system 100.

Preferably, the memory 220 and/or the storage 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable or remote such as cloud based data storage systems.

One or more software modules 230 are encoded in the storage 290 and/or in the memory 220. The software modules 230 can comprise one or more software programs or applications having computer program code or a set of instructions executed in the processor 210. Such computer program code or instructions for carrying out operations and implementing aspects of the systems and methods disclosed herein can be written in any combination of one or more programming languages. The program code can execute entirely on HMI 105, as a stand-alone software package, partly on the HMI and partly on a remote computer/device (e.g., control computer 110) or entirely on such remote computers/devices. In the latter scenario, the remote computer systems can be connected to HMI 105 through any type of network, including a local area network (LAN) or a wide area network (WAN), or the connection can be made through an external computer (for example, through the Internet using an Internet Service Provider).

Preferably, included among the software modules 230 is a database module 270, a configuration module 272, a position module 274, a sensor module 276, a communication module 278, and a user-interface module 280 that are executed by processor 210. During execution of the software modules 230, the processor 210 is configured to perform various operations relating to the configuration of robots, as will be described in greater detail below.

It can also be said that the program code of the software modules 230 and one or more of the non-transitory computer readable storage devices (such as the memory 220 and/or the storage 290) form a computer program product that can be manufactured and/or distributed in accordance with the present disclosure, as is known to those of ordinary skill in the art.

It should be understood that in some illustrative embodiments, one or more of the software modules 230 can be downloaded over a network to the storage 290 from another device or system via communication interface 250 for use within the system for configuring field robots 100.

In addition, it should be noted that other information and/or data relevant to the operation of the present systems and methods can also be stored on the storage 290, for instance various control programs 288 used in the configuration of the field robots prior to deployment and control of the field robots during use, as will be discussed in greater detail below.

A database 285 can also be stored on the storage 290. Database 285 can contain and/or maintain various data items and elements that are utilized throughout the various operations of the system for configuring field robots 100. Preferably, some or all of the stored information in the database 285 can be actionable data that is in a form or can be transformed into a form that enables the robot to undertake an action as needed by the program that implements any given application. The information stored in database 185 can include, but is not limited to, information relating to one or more operational environments, for instance, the particular layout of various solar array installations, a map of terrain that the robots are operating in, and the particular formation of devices upon deployment. The information stored on the database can also include configuration data relating to the computing infrastructure in the field (e.g., location and networking information for wireless routers or repeaters, the control computer 110 or weather station 115 and the like). The database can also include device-specific applications that, when executed by the processor 210, configure the processor to communicate with and set-up various types of devices that comprise the system 100. Similarly, the database can store other operational parameters that are specific to the various devices.

It should be noted that although database 285 is depicted as being configured locally to the storage of the HMI 105, in certain implementations, database 285 and/or various of the data elements stored therein can be located remotely (such as on the controller computer 110 or another remote server—not shown) and connected to the HMI 105 through a network in a manner known to those of ordinary skill in the art.

A communication interface 250 is also operatively connected to the processor 210 and can be any interface that enables communication between the HMI 205 and external devices, machines and/or elements such as the control computer 110 and/or weather station 115. Preferably, the communication interface 250 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting HMI 105 to other computing devices and/or communication networks, such as private networks and the Internet. Such connections can include a wired connection or a wireless connection (e.g., using the IEEE 802.11 standard) though it should be understood that communication interface 250 can be practically any interface that enables communication to/from the HMI 205.

NFC wirelessly operates over a short range, typically under about 4 cm. An NFC connection includes at least two devices, an initiator (e.g., the HMI) and a target (e.g., the robot). The initiator is the device that starts the NFC connection, by generating a radio frequency (RF) field that modulates toward a target device in the form of a request for connection. The target then responds to the initiator request and communication begins. An NFC connection can be established in two modes, Active communication mode and Passive communication mode, depending on the target device. While the initiator is always a powered device capable of generating an RF field, the target may or may not be capable of generating its own RF field. In Active mode, both the initiator and target are powered and capable of generating their own RF field to communicate. The initiator starts the communication, and the target responds by modulating its own RF field toward the initiator. In Passive mode, the initiator starts the communication, and the target responds by modulating the initiator's RF field back to the initiator. By employing one of these modes of NFC, a secure connection between the HMI and the robot can be established.

It can be appreciated that in some implementations the HMI can be configured to transmit/write information to the field devices and/or read information therefrom. In addition or alternatively, the field devices can be configured to read information from the HMI and/or write information to the HMI.

Figure 3:
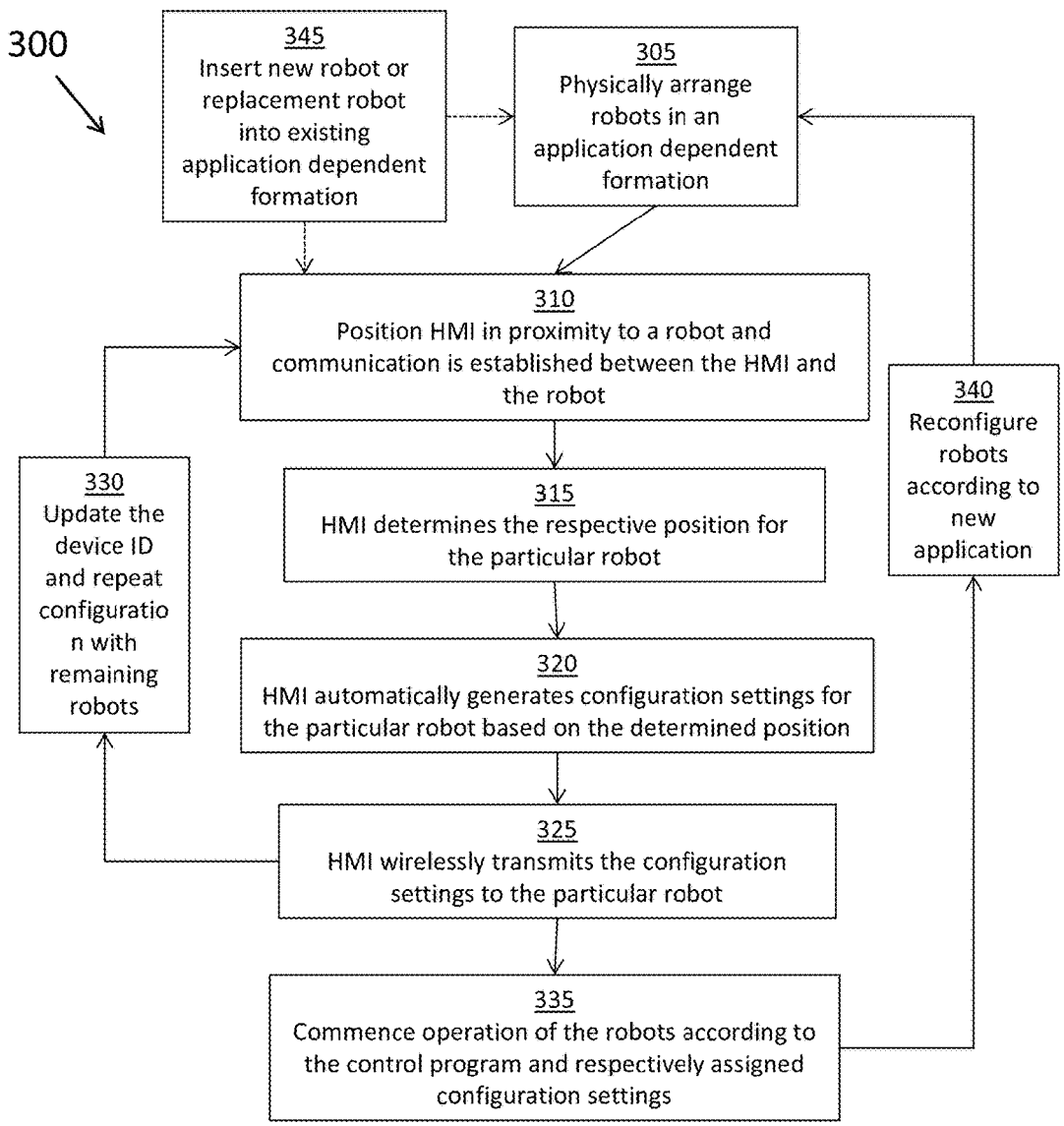
FIG. 3 is a flow diagram showing a routine that illustrates the systems and methods for configuring field devices according to an embodiment of the present invention.

The operation of the system for wirelessly configuring field devices 100 and the various elements and components described above will be further appreciated with reference to FIG. 3. FIG. 3 is a high-level flow diagram illustrating elements of a method 300 for configuring field devices according to embodiments of the invention. Routine 300 starts at step 305, when the field devices are physically arranged in a formation at respective starting positions in the formation. For instance, in the exemplary solar-panel cleaning application, a robot can be placed on a respective row of solar panels among a plurality of rows. It can be appreciated that more than one robot can be placed on a particular panel, and the particular formation of the robots can be dependent on the particular application, e.g., the solar installation as well as the intended function of the robot group. Physically arranging the robots to respective starting positions forms the application dependent pattern or formation and because each robot is essentially identical prior to configuration, the robots can be arranged without regard to which particular robot occupies which position in the formation.

Then at step 310, the HMI is positioned in close proximity to a particular field device placed at a respective position in the formation (e.g., on a particular row) and communication is established between the HMI and the particular robot. More specifically, the HMI processor 210, which is configured by executing one or more of the software modules 230, including, preferably, the sensor module 276 and the communication module 278, can detect an event corresponding to the HMI being placed in proximity to the particular robot. For instance, the HMI processor can be configured to sense a physical tap of the HMI to an object from an on-board accelerometer sensor and initiate the robot-identity-assignment function. By way of further example, the HMI processor 201, which is configured by executing the user-interface module 280, can receive a user input from the operator via the user interface 225 and initiate the robot-identity-assignment function. In addition or alternatively, the HMI processor using the NFC transceiver 250 can automatically detect that an NFC transceiver on-board the robot is in communication range.

At step 315, the HMI determines the respective position for the particular field device. More specifically, the HMI processor 210, which is configured by executing one or more of the software modules 230, including, preferably, the sensor module 276 and the configuration module 272, can automatically detect the position of the particular robot within the formation.

In some implementations, the HMI processor, using the display 235, can instruct the operator of the HMI to begin configuration at a first position in the formation and then sequentially proceed to configure the other robots according to a prescribed order. The particular configuration order/sequence can be pre-defined for the particular application/formation (e.g., rows 1, 2, 3 then 4) or a generic configuration sequence (e.g., start at the top left edge of the formation and proceed right configuring each robot and then move down to the next row of robots and work back left). For instance, the operator can begin at one end of a first row of solar panels, configure the robot placed thereon, and then repeat the configuration process for the next row. Accordingly, the HMI processor can be configured to automatically determine the position of the particular robot being configured at that time based on a record of previous robot configurations and the pre-defined order for the particular formation (assuming the operator is configuring the devices according to the pre-defined sequence). In some implementations, the HMI processor can be configured to automatically identify the particular position in the formation, for instance, by detecting a current location of the HMI using a GPS sensor or other location sensing device (e.g., wifi or other location sensing technology) and cross-referencing the location with a stored layout of the array of solar panels. By way of further example, the HMI can be configured to scan a unique identifier for each solar panel row (e.g., read a barcode using a camera) and cross-reference the identifier with the stored layout and corresponding robot formation and, accordingly, determine the particular position of the associated robot. In some implementations, the position sensor(s) can be on-board the field devices and, as such, the HMI can be configured to query or read the position as provided by the position sensor and determine the respective position of each field device based on position data provided by the individual device.

Then at step 320, the HMI automatically generates configuration settings for the particular field device based on the determined position. In particular, the HMI processor 210 executing one or more of the software modules 230, including, preferably, the configuration module 272 can automatically define configuration parameters for the robot. The configuration parameters include at least a unique identity that is assigned based on the particular robot's position in the formation. For instance, a robot placed at the first position in the formation can be automatically assigned a corresponding ID (e.g., robot 1). Similarly, the robot placed at the second position can be assigned an identifier signifying a second position (e.g., robot 2), and so on. The automatic configuration settings can use the position information, for example, to index the settings to account for the position of the robot within the array.

As previously noted, each of the field devices in the group are identical in that they are configured to operate according to the same control program. In other words, the robots are identically programmed prior to receiving unique configuration settings from the HMI during deployment. Accordingly, prior to deployment, the same control program can be downloaded to the memory of each robot thereby enabling each robot in the group to perform any of the various robot roles defined by the control program. However, in order to accomplish advanced robot behaviors, such as adapting individual robot's cleaning schedules according to wind direction to minimize the effect of dust resettling on cleaned panels, it is preferable for each robot to behave individually and also as a coordinated member of the cleaning solution. In order to accomplish this, each robot is assigned an ID that is unique (amongst the group) and, according to a salient aspect, is assigned as a function of the robot's position within the formation. Moreover, the ID is assigned independent of any pre-existing identifier for the particular robot (e.g., MAC address or manufacturer assigned identifier). It is beneficial for the robots to be assigned a unique identity, which is functionally significant in terms of the particular control program, as it allows the robot to know its position, relationship to other robots and/or allows a centralized control station to identify the robot's relative position in the system.

The exemplary configuration method that includes assigning generic identifiers to the robots as a function of the position in the formation streamlines the configuration process by, among other things, eliminating the need to read preexisting IDs from each field device or placing specific, pre-programmed field devices in specific positions and further minimizes the amount of information that is transferred to the robot in the field. Moreover, as previously noted and further described herein, the HMI can be configured to further streamline the configuration process by automatically incrementing the value of the device ID as successive devices in the formation are configured according to the pre-planned, application-specific order.

In addition, the configuration parameters can also be defined based upon application-dependent formation details.

For instance, application-dependent formation details can include localization data such as an orientation of the field device, an absolute position of the field device and a position of the field device relative to other field devices, devices or reference points/landmarks within the operating environment. In mobile robotics, localization data is understood as the data that determines the position and orientation of an object relative to a reference frame and can be used for proper navigation, path planning, mapping and other tasks performed by the robot according to the control program. More specifically, by placing the HMI in proximity to the robot and in registry with the orientation of the robot's body, the HMI processor can be configured to automatically sense position/location and other sensor information and automatically determine the position of the robot, the specific orientation of the robot (e.g., a starting location or direction) and relative location. Based on the position information and the particular role of the field device as defined by the control program, the HMI can generate appropriate configuration parameters (e.g., assign the location, orientation, distance from another field device etc.) for the particular field device. By way of further example, application-dependent details can include parameters relating to the particular position in the formation, for instance, stored dimensions, orientation, layout of the particular row of solar panels that the robot is deployed on.

These application-dependent formation details can be provided to the robot, as further described herein, so as to configure the robot to operate according to position-dependent requirements. In view of the foregoing, it can be appreciated that position information collected by the HMI can be leveraged to configure the robots without requiring such hardware and functionality on each of the robots.

The configuration parameters can also include settings that are distributed to multiple robots in the group, for example, wireless connectivity settings that serve to enable communication between one or more of the robots and a particular control computer 110 or weather station 115 (e.g., the closest weather station) such that the subset of robots can wirelessly receive weather-related information or commands during operation and otherwise communicate with the remote computing devices.

According to a further aspect, generating configuration settings can also include reading data from field devices, by the HMI, for instance, using the NFC transceiver. As previously noted, the HMI can be programmed to read information providing the robot type and automatically launch the appropriate configuration software application that enables the HMI to communicate with and configure the robot based on the particular requirements of the robot (e.g., robot type specific capabilities and functionality) and in further view of the application-dependent requirements. In addition or alternatively, the HMI can acquire semi-static data from the robot (e.g., number of cleanings, servicing history, battery level, notes from other operators, etc.) as well as live-data from the robot (e.g., power consumption, robot status, information from other robots/overall fleet health, encoder readings, etc.). Such information can be recorded by the HMI and provided to a supervisory controller, such as the control computer 110, and can be used to modify the configuration of the particular robot according to the control program or real-time control of the robots during operation by the control computer 110.

In addition, the data read from the robot and other settings for the robot can be displayed to the user by the HMI using the display, thereby providing the operator the ability to change otherwise default settings as desired, and then send the updated settings to the device using the HMI.

Then at step 325, the HMI wirelessly transmits to the particular robot the configuration settings generated for that particular robot. In one implementation, the transmission of configuration settings can be conducted using the NFC transceivers on board the HMI and the robot. As previously noted, the foregoing method and use of NFC transceivers facilitates the efficient configuration of the robot by a) not requiring expensive and power consuming wireless transmitters on each robot; b) transferring only the required configuration parameters in the field and minimizing the bandwidth required to configure a robot in the field; c) eliminating wired connections and exposed ports on the robots or the HMI.

Then at step 330, steps 310-325 described above can be repeated for the remaining robots in the formation. As previously noted, through the HMI coordinated configuration of the robots, including the position-dependent assignment of device IDs and configuration parameters to each operationally identical robot using NFC, each robot can be quickly and efficiently assigned a respective role in the group "on the fly" during deployment and without extensive customized programming for each robot. Likewise, as shown at step 345, robots can be configured according to steps 310-335 and assigned a device ID in order to fill a position previously occupied by other robots to fill any voids, such as to account for a robot that goes missing, is destroyed, or re-deployed for another purpose. For example, a new device can be assigned a device ID associated with a position in the formation that was previously occupied by a device that is no longer operational. Similarly, a new robot can be introduced to the group so as to augment the existing application dependent formation.

Then at step 335, the group of robots can be instructed to commence operation according to the robots pre-loaded control program and assigned configuration settings. For instance, the HMI can report completion of the configuration process to the controller computer 110, at which point, the controller computer 110 can instruct the robot devices to begin operation. By way of further example, the HMI can wirelessly instruct the robots to begin or otherwise act as the computer controller issuing commands and information to the robots to facilitate operation according to the control program.

It can be appreciated that, due to the on-demand assignment of IDs to the field devices (e.g., robots) during deployment, the devices can be collected after deployment without regard for the particular device ID or location and easily transferred to a new location and re-configured to operate at the new location.

As shown in FIG. 3, the routine 300 can also include step 340, wherein the configuration steps are repeated for a new application. For instance, after performing the operation according to the control program, the robots can be relocated to a new site and reconfigured as described above to operate according to the control program or another control program.

The systems and methods described in relation to FIGS. 1-3 will be further appreciated in view of the following exemplary implementations of the system for configuring field devices 100. In one exemplary implementation, system 100 can be implemented to configure a group of robots to perform coordinated marching maneuvers over terrain, for example and without limitation, maneuvers performed by a color guard. Each robot can be pre-loaded with a control program that includes instructions defining how each member of the color guard formation moves. The four robots can be placed on the terrain in a starting formation and the HMI 105 can be "tapped" on each robot in sequence thereby providing to each robot a respective position in the group as described in steps 310-325. The disclosed methods enable any of the 4 robots to be placed in any of the group positions, and efficient assignment of an identity (e.g., a position in the group') to the robots by 'tapping' the HMI on the top of each robot in sequence. When the robots sense a triggering input, for instance, wireless transmission from another device (e.g., control computer 110), a timer, or other sort of on-board sensor signal, the robots begin operation according to the control program and respective device IDs. Accordingly, each robot is configured to autonomously execute maneuvers differently from the other robots, in at least some respects, even though the programming of each robot is exactly the same. The only difference is each robot includes the additional functionally relevant identifier that was assigned in the field and notifies each robot which element of the group they are. It can be appreciated that additional data could be passed with the tap of the HMI, for instance, the current time, when to start the maneuvers, other such control parameters, and field-acquired information.

Figure 4:
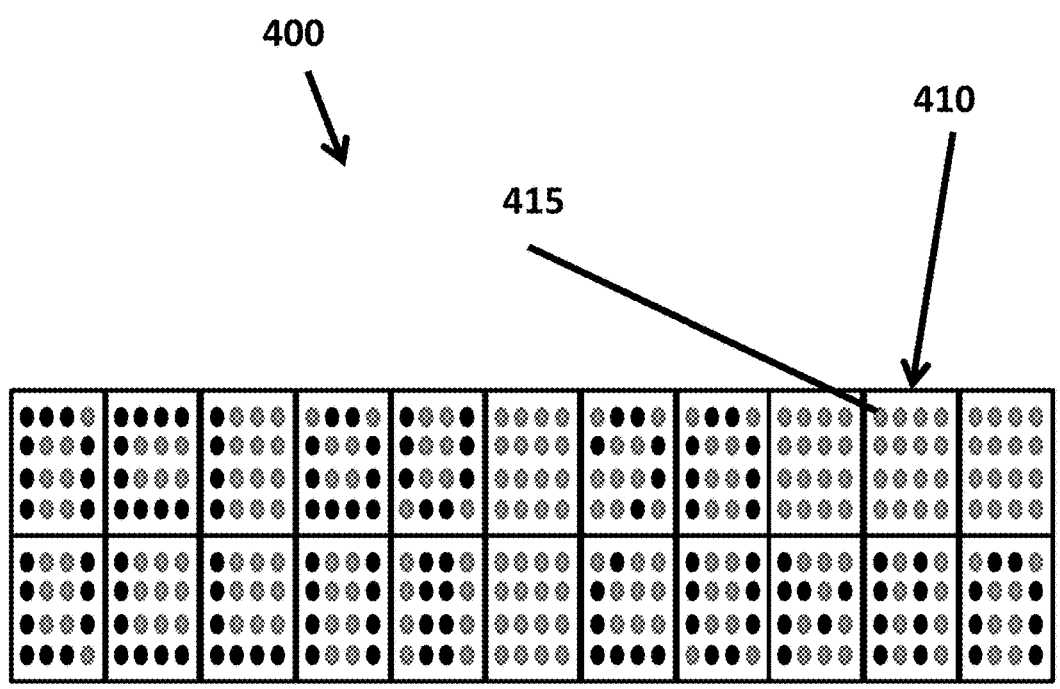
FIG. 4 is a high-level diagram illustrating an exemplary configuration of field devices configured according to an embodiment of the present invention.

By way of further example, the exemplary systems and methods for configuring field robots can also be adapted to configure the coordinated operation of a formation of fixed devices. For instance the systems and methods disclosed herein can be used to configure an array of light emitting devices that are used to provide a coordinated light show. More specifically, individual light-emitting panels (i.e., LED field devices) that are configured to communicate wirelessly (e.g., via NFC or wifi, and the like) and execute a common control program can be arranged in rows thereby defining an application-dependent formation. FIG. 4 depicts an exemplary array of 22 separate LED field devices 410 arranged in an 11 unit long×2 unit tall array 400. Each LED panel (e.g., LED panel 410) includes a 4×4 array of LED bulbs 415. The LED devices can be initially arranged without regard to which particular LED device is at which position in the formation. During configuration, the wireless HMI 105 can be passed over each LED device in a particular sequence (e.g., starting from a top-left corner proceeding across the first row of LED devices, moving down to the next row of LED devices and moving from the right most LED device to the left most LED, and so on). For each LED device, the HMI can assign the unique ID to that device (e.g., sequential numbers that are incremented with each configuration) and gather position information relating to each individual device. Upon completing the ID assignment, the HMI can broadcast the array information (such as width, height, number of LED devices in each row, spacing and the like) to each LED device so as to provide the reference frame of the complete formation. A user could then, using the HMI or other control device, wirelessly broadcast a control command, say, a text string to be displayed by the array. Accordingly, each LED device executing the control program can determine, based upon a respective device ID (e.g., position) and the particular arrangement of the pixel array, whether to light up or not. It can be appreciated that, in addition or alternatively to identifying the application-dependent formation (i.e., reference frame) of the complete array dynamically as a function of the device ID assignment process, the application-dependent formation and related information can similarly be pre-defined prior to deployment.

Figure 5:
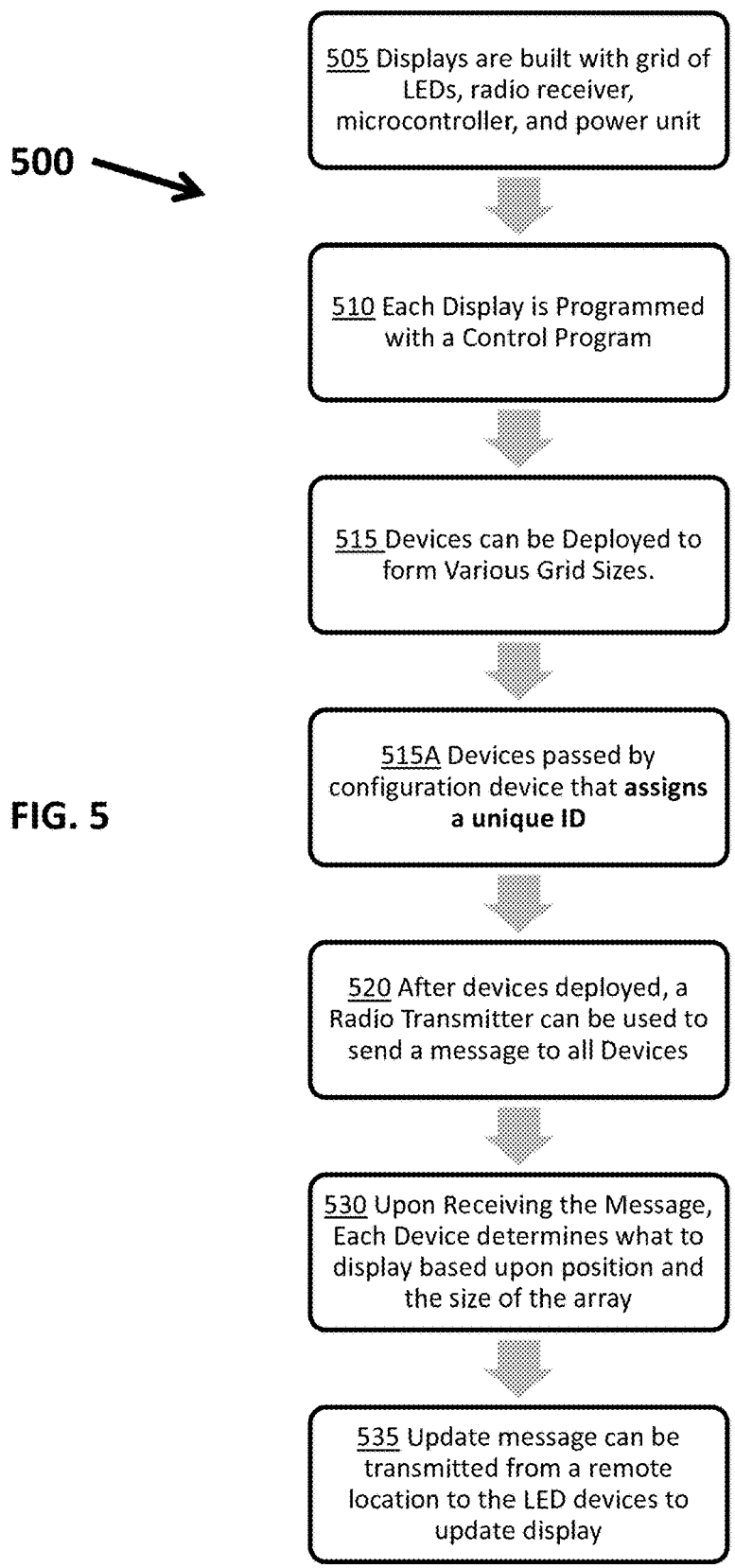
FIG. 5 is a flow diagram showing a routine that illustrates the systems and methods for configuring field devices according to an embodiment of the present invention.

An exemplary method 500 for deploying and configuring the LED Array of FIG. 4 is described in reference to FIG. 5. At step 505, the displays are built as defined with 4×4 grid of LEDs, radio receiver, microcontroller, and battery/solar panel. At step 510, each display is programmed with a control program that configures the LED panel device to, during operation, receive text data over radio communication and convert it into visual output using the LEDs as a function of the position of the LED panel and the size and arrangement of the overall array. Accordingly, the output of the control program for the particular display is deployment specific in that it depends on the overall configuration of the array and the position of the LED device within the array. The LED devices are deployed as an array of LED devices at step 515. In particular, as each LED device is taken from a delivery truck during deployment, at step 515A they can be passed by a configuration device (e.g., an HMI) that is configured to assign each device a unique device ID. As noted above, the assigned device ID can be incrementally assigned based on the formation, as well as the size of the array. Due to the modular nature of the devices and common control program that adapts each device's operation based on to the specific arrangement of the field devices, the devices can be deployed in various grid sizes. As mentioned above, the array details could be sent to each device during deployment, in the event of the final formation being prescribed, or provided after deployment of the devices, in the event of the final formation being uncertain. In this particular LED display example, the arrangement of individual devices can be prescribed depending on the message length or text size requirements and other such practical considerations. In some implementations, special software concerning the control program can be running on the HMI or another computing device used by the individual deploying the array so as to recommend the appropriate configuration. For example, based on application requirements such as the expected message length/complexity requirements for the application the control program can recommend the ideal array formation. During deployment, the configuration device/HMI can communicate the configuration parameters including the device ID to the LED Device using wireless communication such as NFC, as NFC would be effective in accomplishing a low-data rate, device specific transfer of information.

At step 520, after the formation of LED devices is set-up, a radio transmitter can be used to send a message (e.g., "DELAY 20 min") to the LED devices. At step 525, the message is received by all LED Devices. Upon receiving the message, at step 530, the devices determine individually and according to the control program what portion of the message should be displayed and how it should be displayed based upon the assigned device ID, array size, and position within the array. At step 535, if the message displayed needs to be changed or other settings adjusted, a radio signal including such updates can be broadcast to the LED displays from a remote location via radio frequency transmission. When no longer needed, the array of LED displays can be taken apart and stored (e.g., stacked up, put back into the back of a truck and set to charge if necessary).

Figure 6:
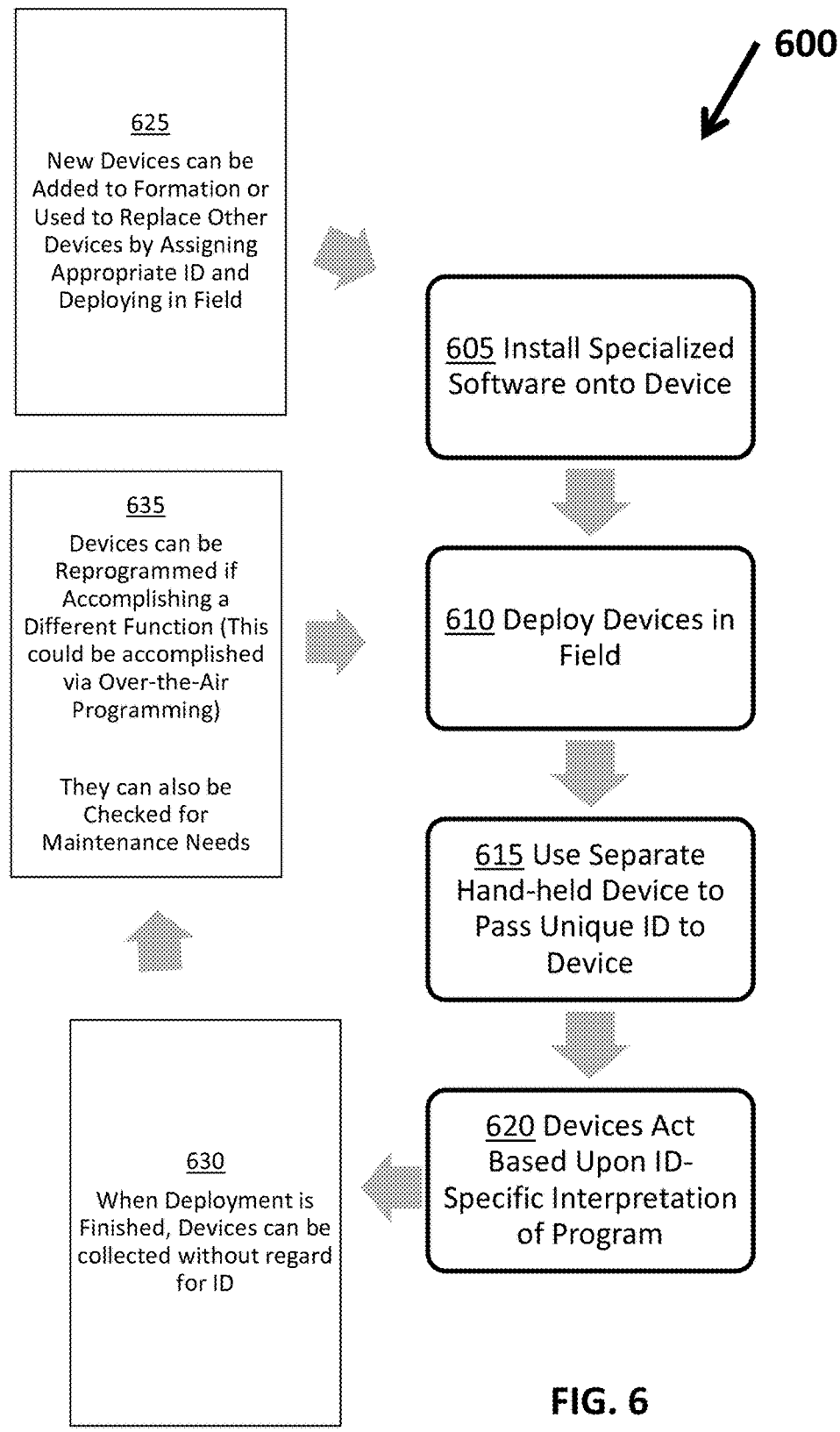
FIG. 6 is a flow diagram showing a routine that illustrates the systems and methods for configuring field devices according to an embodiment of the present invention.

FIG. 6 depicts an exemplary method 600 for deployment of field devices and performing device ID assignment using a hand-held device. The process begins at step 605, when specialized control software is installed onto the field devices. As described above, the control software utilizes unique device IDs that are specifically related to a relative position in the application-dependent formation to control actions of the field devices during operation. As noted above, the control software could be installed once "in factory" or reprogrammed for specific types of applications thereafter.

At step 610, the field devices are deployed in the field. For example, deployment can be guided by a pre-defined pattern such as the specific layout of the environment that the devices will be operating in (e.g., the application-specific layout of a solar panel array). In this exemplary implementation, the devices are identically built and programmed. Thus, the devices can be interchanged during deployment as there is no need to put specific devices into specific places or otherwise track unique hardware IDs. At step 615, a hand-held HMI device as previously described is used to assign and pass configuration settings including, at least, a unique device ID to each of the devices. As described above, assignment of device IDs and other configuration settings can be based on a particular sequence set according to a pre-defined deployment pattern (e.g., 1, 2, 3 . . . ). In addition or alternatively, the HMI can utilize location sensors in the HMI (or located on board the field device) to assign each device's unique device ID based on an absolute or relative position. Connection for the transfer of the configuration data can be accomplished using wired connection or a wireless connection, such as NFC, or a combination of the foregoing. For example, initial device configuration data and device ID assignment could be performed using NFC for security. Once device ID assignment is complete, a higher bandwidth communications connection can be established to conduct additional data transfer between the field device and another device such as the HMI or control computer devices. It can be appreciated that these higher bandwidth communications channels can be used to further configure and, in some implementations, help to control the field devices during operation. Additional hybrid communication schemes can be employed to complete field device configuration and/or enable data, commands and the like to be sent wirelessly to the field devices during operation. In some implementations, the HMI could also maintain other application specific information (e.g., cleaning frequency, terrain maps, etc.) that can be transferred to the devices during configuration.

In addition or alternatively to assigning the device ID and configuration parameters using NFC transmission as each device is deployed, as described in relation to step 615 above, device ID assignment can be conducted wirelessly using long range wireless communication after physical deployment. More specifically, a control device (e.g., a hand-held HMI, a stationary HMI, a centralized control computer, and the like) can broadcast a command requesting a location from each of the devices. The request can be addressed using MAC address or similar ID or can be device agnostic. In response to the request, each field device can respond with at least a respective location. Each field device can determine its location from an on-board position sensor or, alternatively, can be provided with the position by the HMI during deployment. Based on the received location information, the control device can determine the formation of the devices and assign unique device IDs to each device based on a respective position within the formation accordingly and then transmit the unique IDs to the field devices. For instance, the control device can address the transmission of a unique device IDs using each device's MAC address so as to send the information to only the relevant field devices. It can also be appreciated that broadcast information exchanged between each device and the control computer during configuration could also include application specific information (e.g., cleaning frequency, terrain maps, etc.) that can be used to configure the devices as well as control operation of the devices according to the control program.

Then at step 620, the devices are put into operation and each commence operation based upon a respective device ID-specific interpretation of the control program. Execution of the control program could be initiated by an external signal received at the field device (e.g., longer range wireless command, sound, light, etc.). In some implementations, group operation could be initiated by one of the robots (e.g., robot 1 acts as control and issues command to other robots). In some implementations, group operation could be initiated by the HMI used for configuration of the devices. For example, the HMI can be configured to issue commands to initiate operation for short term deployments (e.g., drones on a scouting mission) and/or for long-term deployments (e.g., solar cleaning robots). In instances where field devices require affirmative instructions to begin to operate (e.g., a "start action" command), such commands can be broadcast by the HMI or control computer or other remotely located control device. It can be appreciated that even though outside devices can issue certain commands that guide operation of the group, each robot can be configured to act differently to the same command based on the device ID assigned during deployment. It can also be appreciated that assigned device IDs can also be used to send device-specific commands (e.g., "#4 start now") to specific devices. However, it can also be appreciated that whereas traditional systems address commands to devices using a static identifier (e.g., MAC address), according to the disclosed embodiments, specific commands are addressed using formation logic.

As noted above and shown as step 625, new devices can be added to a formation or used to replace other devices by simply assigning the appropriate device ID and deploying in the field. As shown at step 630, when deployment is finished, devices can be collected without regard to keeping track of device ID. In addition, as shown at step 635, devices can be reprogrammed to perform a different function dynamically during operation or in connection with deployment in a new environment. Deployment/configuration information can be provided to the devices in the manner described above, however, in some implementations, over-the-air programming (e.g., via WIFI, cellular communications etc.) can be used to update a device's existing configuration settings.

As previously mentioned, the exemplary embodiments of the subject invention can be similarly applied to configure and/or control groups of field devices of varying types such that the field devices perform non-identical operations in a coordinated manner. These and other aspects of the disclosed embodiments are further described herein in connection with FIGS. 7-10. In one exemplary implementation, the systems and methods for configuring field devices can be utilized to configure one or more groups of drones (i.e., field devices).

FIG. 7A is a high level diagram illustrating an exemplary group 700 of drone aircraft. As shown, the group 700 is comprised of two sub-groups, scouts and trackers, wherein the scout subgroup consists of three drones, S1, S2 and S3 and the tracker subgroup consists of two drones, T1 and T2. Drones within each-subgroup are preferably the same type, meaning that they are identically programmed based on the hardware and/or role. Accordingly the entire group 700 consists of drones of varying type. It can be appreciated that different makes/models of devices can be used and operationally considered the same "type" provided that the field devices in a group are programmed to operate according to the same control program. It should be further appreciated that different makes/models can be considered the same type (e.g., operate according to a common control program) even if they are programmed with a respective version of the control program (e.g., a make/model specific version of the control program).

Figure 7D:
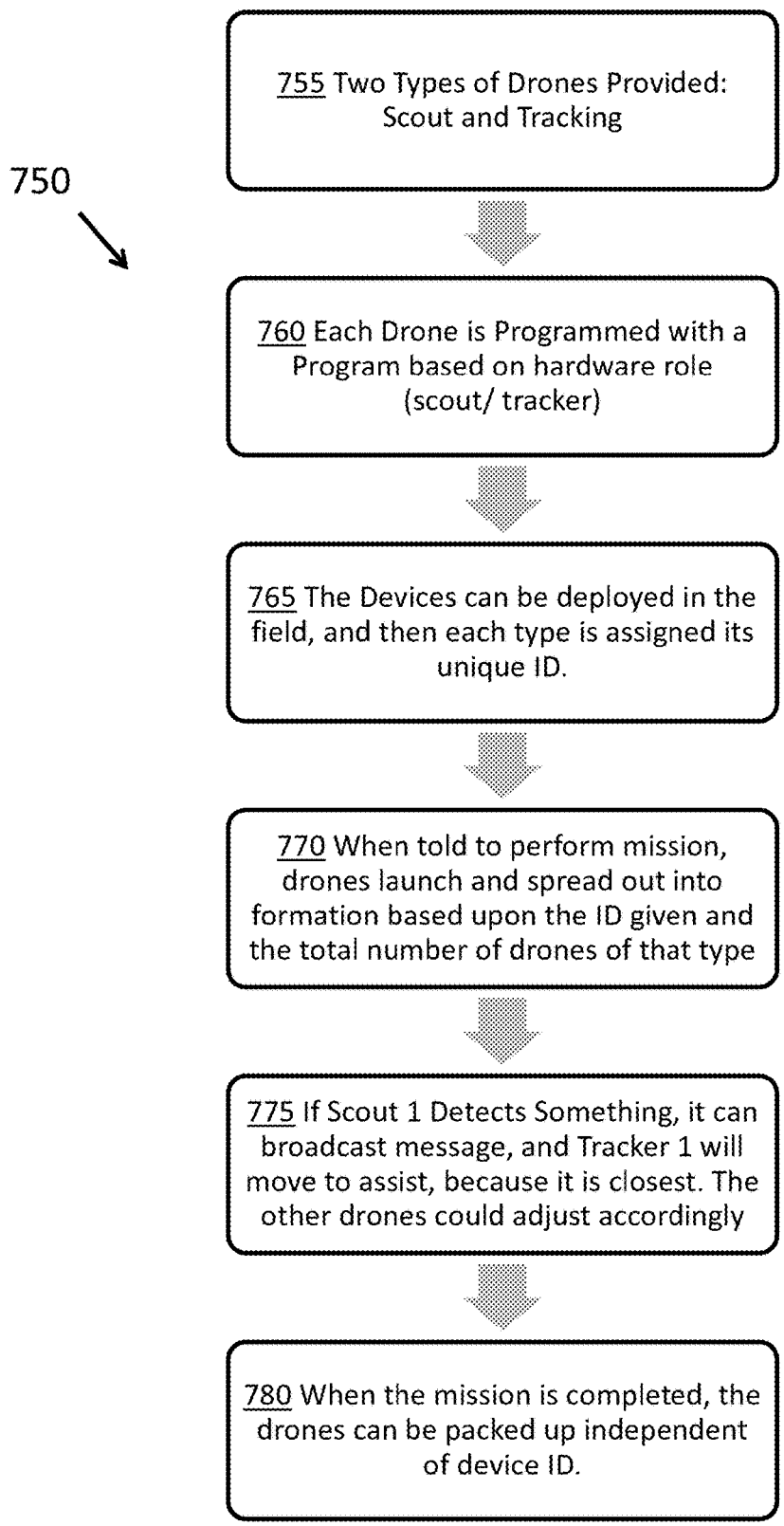
FIG. 7D is a flow diagram showing a routine that illustrates the systems and methods for configuring field devices according to an embodiment of the present invention.

Turning briefly to FIG. 7D, which illustrates an exemplary routine 750 for the deployment, configuration and operation of the group of drones 700 in accordance with one or more of the disclosed embodiments. At step 755, two types of drones are provided, scouts (e.g., S1-S3) and trackers (e.g., T1-T2). At step 760, each drone is programmed with a control program based on hardware role (scout/tracker). As noted above, drones that are the same type are identically programmed with the same control program. Drones of different types are preferably provided with a respective version of the control program, in other words, a control program that is tailored to the drone's respective type/task/function. However, it can be appreciated that, in order for drones of different types to operate in a coordinated manner, the respective control programs should be related.

At step 765, the drones can be deployed in the field. During deployment each drone can be assigned a unique device ID and other configuration parameters using an HMI as described above. For example, during deployment the HMI can detect a type of the drone being configured and assign an ID and configuration parameters based on type. Device ID can also be assigned based on position in the formation, for instance, from left to right (although this could be arbitrary too, if starting position is not important). Configuration parameters can also be determined and provided to the drones as a function of the composition of the group 700 and the sub groups (e.g., five total drones including two trackers and two scouts) so as to enable each device to operate according to the control program and in view of the configuration of the group and the device's position in the formation in relation to the other devices in the group.

At step 770, when instructed to begin a mission (e.g., execute the control program), the drones launch and spread out into a formation defined by the control program and execute the planned flight path defined by the control program. For example, the formation and each drone's position within the formation can be defined by the control program based upon at least the device ID assigned. In addition the drone's position in the formation and operation can be based on the total number of drones having the same type and/or total number of drones in the group and/or other types of drone in the group. It can also be appreciated that the particular flight path and other application-specific parameters for a mission could, in some implementations be provided during deployment. Accordingly, parameters for each mission can be provided during deployment and without requiring pre-programming, whereas the complex control program that defines how each of the devices operate individually and in a coordinated manner to perform the particular mission is pre-loaded prior to deployment. An exemplary planned flight path 720, and the position of each drone (e.g., S1-S3, T1-T2) within the formation is shown in FIG. 7B. As shown, the drones can be deployed at location 710 and begin flying in a formation along respective flight paths.

It can be further appreciated that the device ID and the configuration information provided to each drone can also serve to inform the independent operation of the drone during the operation and how drones of the same type and drones of different types operate in a coordinated manner. FIG. 7C depicts the actual flight path 730 of the drones and is provided to illustrate the dynamic adjustment of the group's flight path according to the control program and in view of events that occur during operation. For instance, at step 775 of FIG. 7D, if scout S1 detects an event on path 1, S1 can broadcast a message to one or more of the other devices (e.g., using wireless communication transceiver). The message can cause one or more of the other drones to adjust operation according to the event and the common control program. For example, as shown in FIG. 7C, tracker T1 can move to assist and investigate the event, say, because it is the closest tracker drone. In addition, the other drones can also be configured by the control program and the specific circumstances of the operation and events to dynamically adjust. For instance, as shown in FIG. 7C, based on the detection of the event and the re-direction of tracker T1, tracker T2 can re-center its route after tracker T1 is deployed. It should be appreciated that this is only one example of the coordinated and dynamically adjusting operation of multiple field devices of different types and that various other dynamic adjustments and coordinated maneuvers across any number of types of devices can be performed. Finally, at step 780, when the mission is completed, the drones can be packed up independent of assigned ID.

Figure 8A:
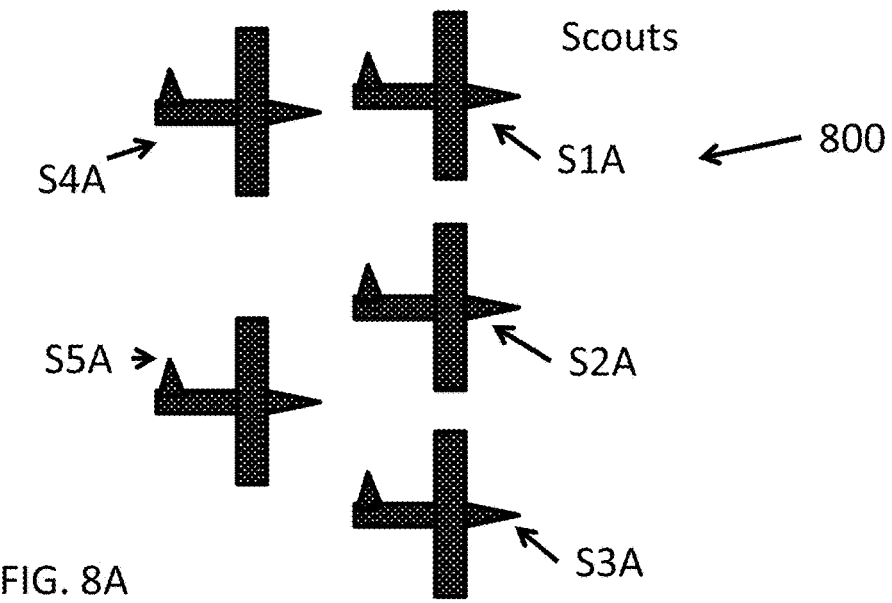
FIG. 8A is a high-level diagram illustrating an exemplary configuration of field devices configured according to an embodiment of the present invention.
Figure 8B:
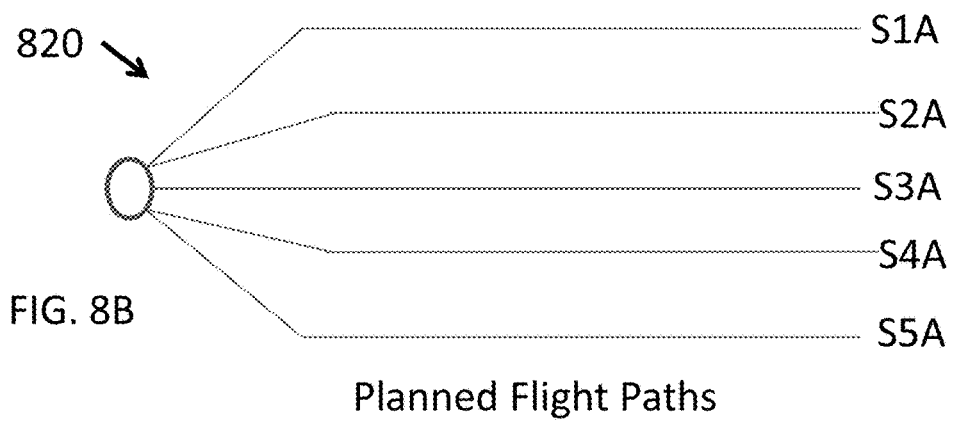
FIG. 8B is a high-level diagram illustrating an exemplary operation plan for the group of field devices depicted in FIG. 7A.
Figure 8C:
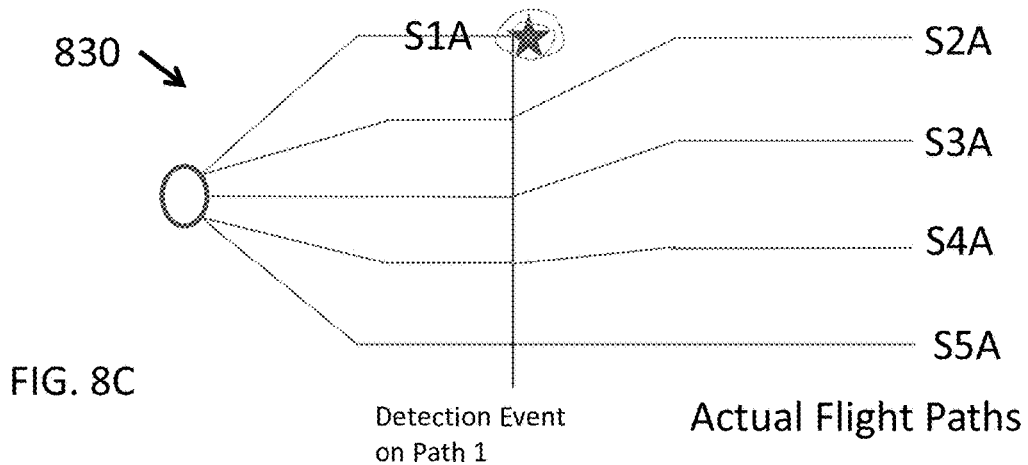
FIG. 8C is a high-level diagram illustrating an adapted operation plan for the group of field devices depicted in FIG. 7A.

FIGS. 8A-8C are provided to illustrate a further implementation of the exemplary embodiments, in particular, to illustrate systems and methods relating to dynamically updating one or more field devices during operation. FIG. 8A illustrates an exemplary group 800 of identically built drone aircraft that are also identically programmed with the same control program. As shown, the five drones of group 800 are originally assigned to serve a particular role/function as "scout" drones according to the control program. The scout drones can be deployed and assigned respective device IDs as described above, for example, the devices can be assigned unique device IDs 1-5 reflecting a respective position in the five drone group. The drones are accordingly labeled S1A-S5A in FIG. 8A. Moreover, during deployment the drones can be provided with configuration parameters relating to a particular mission. For instance, the drones can all be designated as having a particular role e.g., "scout." Based on the assigned device IDs and configuration parameters, the drones can be configured to begin the particular mission according to the control program and follow a planned flight path 820, as shown in FIG. 8B.

As noted above, all five (e.g., identical) drones can be numbered 1 to 5 (as opposed to being numbered separately), and they all can begin the mission in the "scout" role. The unique ID corresponds to a uniquely generated flight path/direction. Pursuant to the control program and initial configuration, the devices can also be configured to deviate from the planned path and re-configure themselves accordingly. For instance, upon detection of an event by scout S1A, that drone can be configured to dynamically change its behavior according to the control program. Accordingly, scout S1A can dynamically change its role from "scout" to a "tracker" role. In addition, such changes can be broadcast to the remaining drones in the group for further adaptation of the group. For example, the broadcast can cause scouts S2A-S5A to redistribute coverage of the environment (e.g., original reconnaissance area) appropriately among the remaining "scouts" as if S1A no longer existed. An example of the adapted flight path 830 of the drones as described above is shown in FIG. 8C. It can be appreciated that the adaptive behavior of the drones can also be performed based on other events, say, lost contact with one or more other drones in the group. By using identical, uniquely numbered devices, this particular example illustrates the adaptive capabilities of the devices and overall formation control that is enabled by the unique device ID assignment method. In particular, device ID assignment in accordance with the disclosed embodiments allows the field devices to adapt and perform coordinated maneuvers with increased flexibility over numbering each device separately (i.e., utilizing device IDs that are assigned without regard to a respective position within the formation).

Figure 8D:
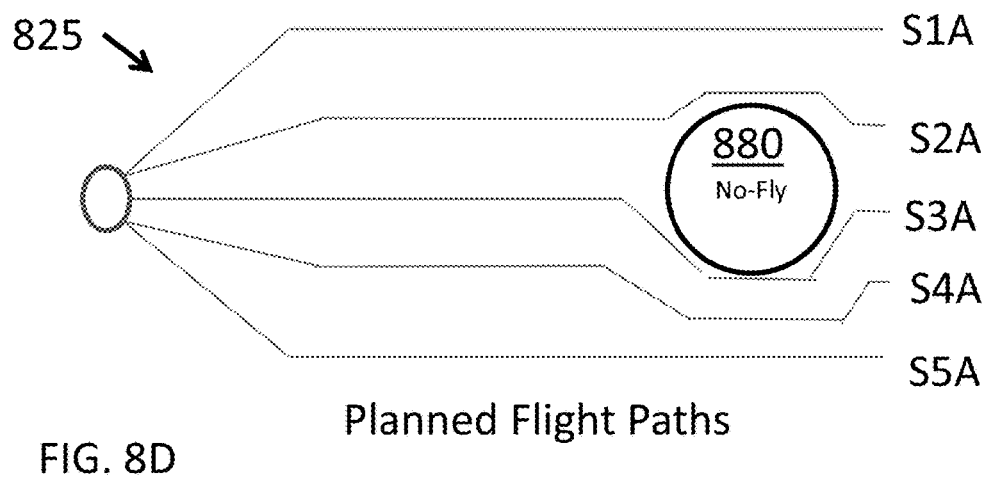
FIG. 8D is a high-level diagram illustrating an exemplary operation plan for the group of field devices depicted in FIG. 7A.
Figure 8E:
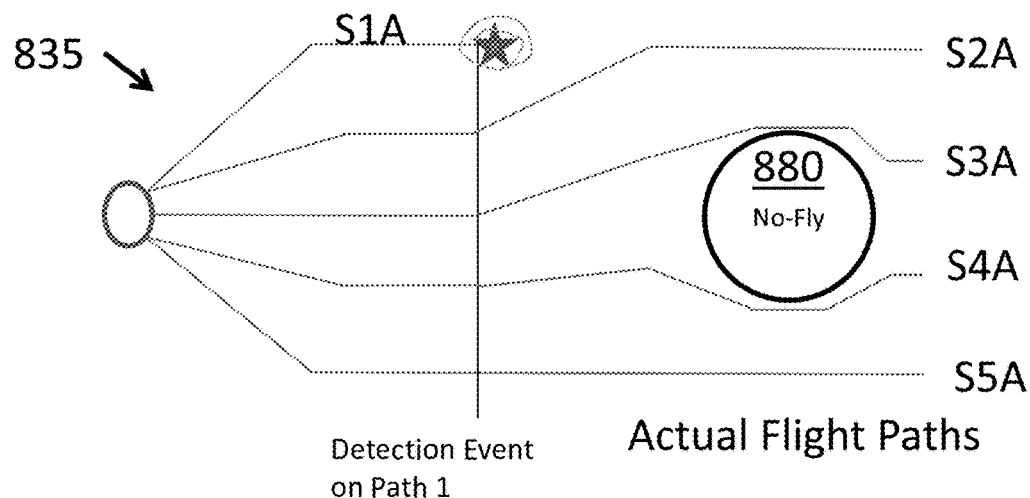
FIG. 8E is a high-level diagram illustrating an adapted operation plan for the group of field devices depicted in FIG. 7A.

A further example of the adaptive behavior of the group of drones 800 is further described below and illustrated in FIGS. 8D-8E. FIG. 8D illustrates another exemplary planned flight path 825 including a "no-fly" zone 880. FIG. 8E illustrates another exemplary adapted flight path 835 based on the flight path of FIG. 8D. This particular exemplary scenario is an extension of the scenario described in connection with FIGS. 8A-8C, however, the configuration parameters also include pre-deployment information identifying the no-fly zone 880. In other words, the configuration parameters also provide application-specific information that instructs the drones to stay out of a specific area. Accordingly, based on the assigned device ID relating to position in the formation, the drones having a position affected by the no-fly zone can automatically adapt the planned flight path using the control program. Moreover, the drones are further configured to dynamically modify the flight path to avoid the no-fly-zone based on the detection of an event (e.g., as described above in relation to FIGS. 8A-8C), even after already adapting to the specific configuration parameters defining the initial distribution of flight paths.

At this juncture, it should be noted that although much of the foregoing description has been directed to systems and methods for wirelessly configuring robotic field devices, the systems and methods disclosed herein can be similarly deployed and/or implemented in scenarios, situations, and settings far beyond the referenced scenarios.

It should be appreciated that more or fewer operations can be performed than shown in the figures and described. These operations can also be performed in a different order than those described. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system and a computer implemented method, computer system, and computer program product for wirelessly configuring field devices. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A method for configuring a plurality of mobile field devices to perform non-identical operations in a coordinated manner according to a control program, each field device including a non-transitory computer readable memory storing the control program, a wireless transceiver and a processor that is configured by executing the control program, comprising:

arranging, in an operational environment, a plurality of field devices to occupy respective starting positions in an application-dependent formation, wherein the field devices are programmed with the same control program and are arranged without regard to which particular field device occupies which starting position in the formation, and wherein the control program on each field device is configured to use a field-assigned respective device identifier (ID) to coordinate non-identical operation by a respective field device and coordinate application-dependent, formation-based operations by the plurality of field devices;

prompting, with an HMI using an associated display, the operator to sequentially configure the plurality of field devices according to a prescribed formation-dependent order beginning with a first starting position in the formation, wherein the HMI is a portable computing device including a computer-readable storage medium having executable instructions stored therein, one or more position sensors, the display, a wireless transceiver and a processor that is configured by executing the instructions; and configuring each of the plurality of field devices, wherein, for each of the plurality of field devices, configuring comprises:

positioning a human-machine interface (HMI) and a particular field device in proximity, establishing, by the HMI using the transceiver, wireless communication between the HMI and the particular field device, determining, by the HMI, the respective starting position occupied by the particular field device in the formation, wherein the respective starting position is a relative position within the formation, and wherein the HMI determines the respective starting position occupied by the particular field device as a function of the prescribed formation-dependent order and a record of any previous configurations of one or more field devices among the plurality of field devices, and, wherein the device ID is incremented by the HMI as each field device is configured automatically defining, by the HMI, configuration settings for the particular field device including at least a respective device identifier (ID), wherein the device IDs are defined incrementally and as a function of the respective starting position within the formation, and transferring, by the HMI using the wireless transceiver, the configuration settings to the particular robot to configure the particular robot; and initiating coordinated operation of the plurality of field devices according to the control program and the respective configuration settings.

2. The method of claim 1, wherein the HMI wireless transceiver is a radio frequency transceiver configured for short-range inductive wireless communication.

3. The method of claim 1, wherein the configuration settings also includes information concerning the formation including one or more of: a number of field devices in the formation, relative positions of the plurality of field devices, a layout of the formation, a layout of the environment.

4. The method of claim 1, wherein the respective device ID is defined irrespective of any pre-existing unique identifier assigned to the particular field device.

5. The method of claim 1, wherein the control program is identical for each of the plurality of field devices and wherein the respective device ID is unique such that, during operation based on the control program, the respective device ID enables unique operation of the respective field devices and coordinated operation of the respective field device relative to the operation of one or more other field devices as a function of the particular position in the formation.

6. The method of claim 1, wherein the one or more position sensors are selected from the group consisting of: a GPS receiver, an accelerometer, and a gravity magnetometer, and wherein determining the respective starting position further comprises:

detecting, with the HMI using the position sensor, a current position of the HMI;

comparing, with the processor, the current position to a reference layout of one or more of the formation and the operational environment; and identifying, by the HMI, the respective starting position based on the comparison.

7. The method of claim 6, further comprising, updating the reference layout in the memory of the HMI according to the detected current position and the assigned device ID.

8. The method of claim 6, wherein defining configuration settings further comprises:

determining, by the HMI using the one or more position sensors, position data for the HMI; and translating the position data into localization data for the particular field device for transmission to the field device, wherein the localization data includes one or more of an orientation, an absolute location, a direction, and a position relative to one or more other devices or landmarks in the reference layout.

9. The method of claim 8, further comprising:

determining, at the HMI, application-dependent parameters relating to the particular position of the particular field device in the formation including one or more of: a layout of at least a portion of the operational environment and control settings that serve to enable communication between the particular field device and other devices within the operational environment; and transmitting, by the HMI using the wireless transceiver, the application-dependent parameters to the particular field device.

10. The method of claim 9, wherein the other devices include one or more stand-alone control computers configured to assist the operation of the plurality of robots according to the control program, and further comprising:

establishing, with the HMI using the wireless transceiver, communication with the one or more stand-alone control computers;

receiving, with the HMI from the one or more stand-alone control computers, the control settings.

11. The method of claim 1, further comprising:

receiving, with the processor from the respective field device, data identifying a type of the field device; and launching, with the HMI processor, a configuration application specific to the identified robot type, and wherein the configuration settings are defined according to the configuration application and as a function of any preceding configurations of one or more other field devices.

12. The method of claim 1, further comprising:

acquiring, with the HMI from the respective field device, operational data including one or more of: an operational history, a power consumption level, an operational status, and sensor readings;

recording, with the HMI in the storage, the acquired operational data;

modifying, with the HMI, the configuration settings according to the acquired operational data; and providing, with the HMI using the wireless transceiver, the operational data to one or more of stand-alone control computers and field devices.

13. The method of claim 1, wherein the field devices are identical mobile robotic devices.

14. The method of claim 1, wherein the field devices are multiple groups of different types of field devices and wherein each group of field devices is comprised of multiple robots of identical type, and further comprising:

performing the configuring step for each of the multiple groups of field devices, and wherein the control program coordinates application-dependent, formation-based operations by the plurality of groups of field devices based on the assigned device IDs and a respective type of field device.

15. The method of claim 1, wherein the HMI serves as a control station for the one or more field devices once configuration is complete.

16. The method of claim 1, wherein the control program coordinates non-identical operation by a respective field device and coordinates application-dependent, formation-based operations by the group of field devices as a function of one or more of: deployment-specific configuration data, sensor data, data detected from a sensor on board the respective field device, and commands received by the respective field device from another device during operation.

17. The method of claim 1, wherein the step of determining the respective starting position occupied by the particular field device in the formation is determined as a function of a user input.

18. The method of claim 16, wherein the HMI transmits operational commands to a particular field device that are addressed using a respective assigned device ID.

19. The method of claim 1, further comprising:
receiving, by the HMI from one or more of the plurality of mobile devices, operational data;
displaying, the operational data with the HMI using an associated display.

20. The method of claim 1, further comprising:
replacing, a particular field device among the plurality of field devices with a replacement field device;
determining, with the HMI, a particular respective device ID assigned to the particular field device being replaced; and
repeating the steps of:
positioning the HMI and a replacement field device in proximity,
establishing, by the HMI using the transceiver, wireless communication between the HMI and the replacement field device,
automatically defining, by the HMI, configuration settings for the replacement field device including at least the particular respective device ID, and
transferring, by the HMI using the wireless transceiver, the configuration settings to the replacement field device to configure the replacement field device.

* * * * *